Figure 1:
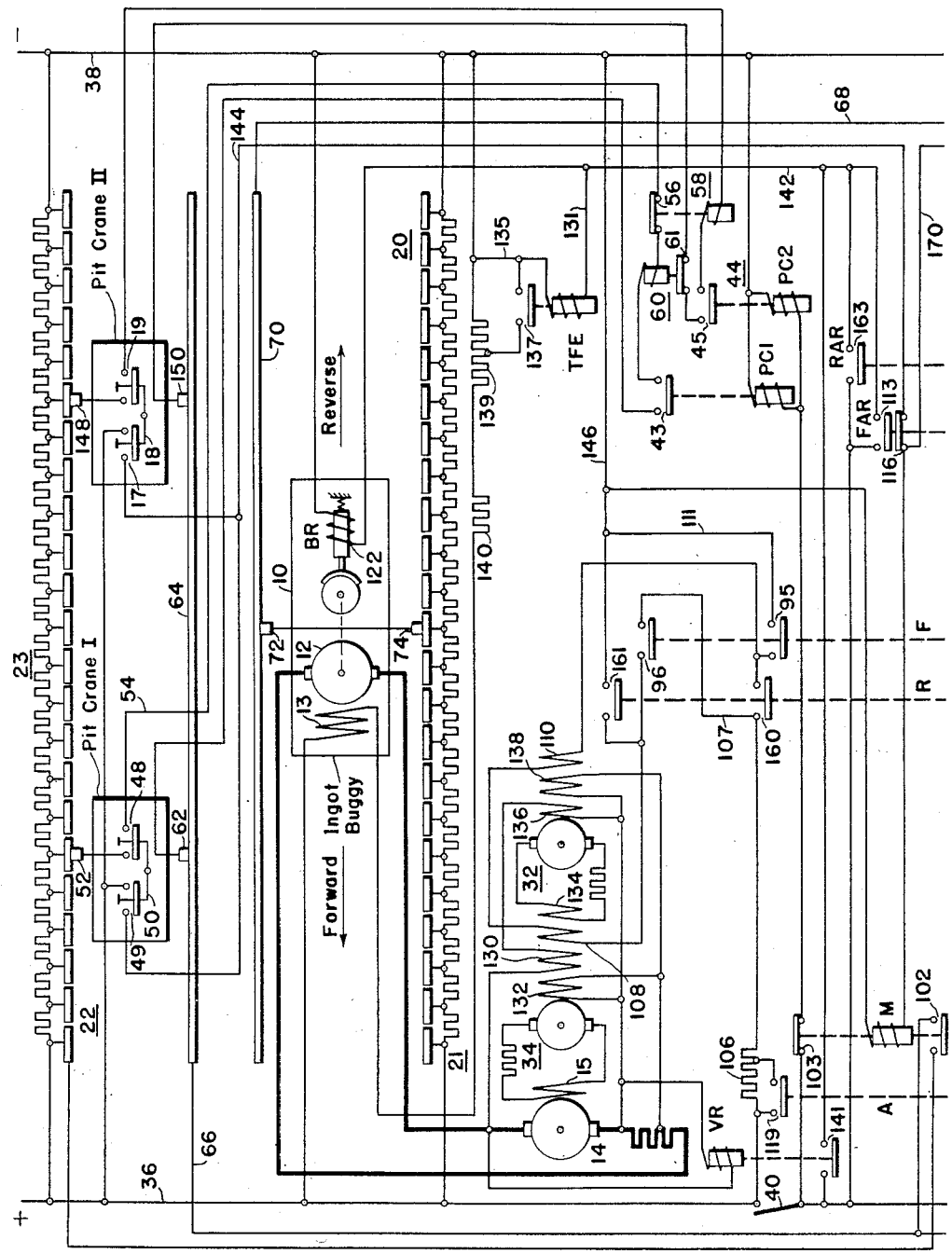

INVENTOR
John R. Erbe

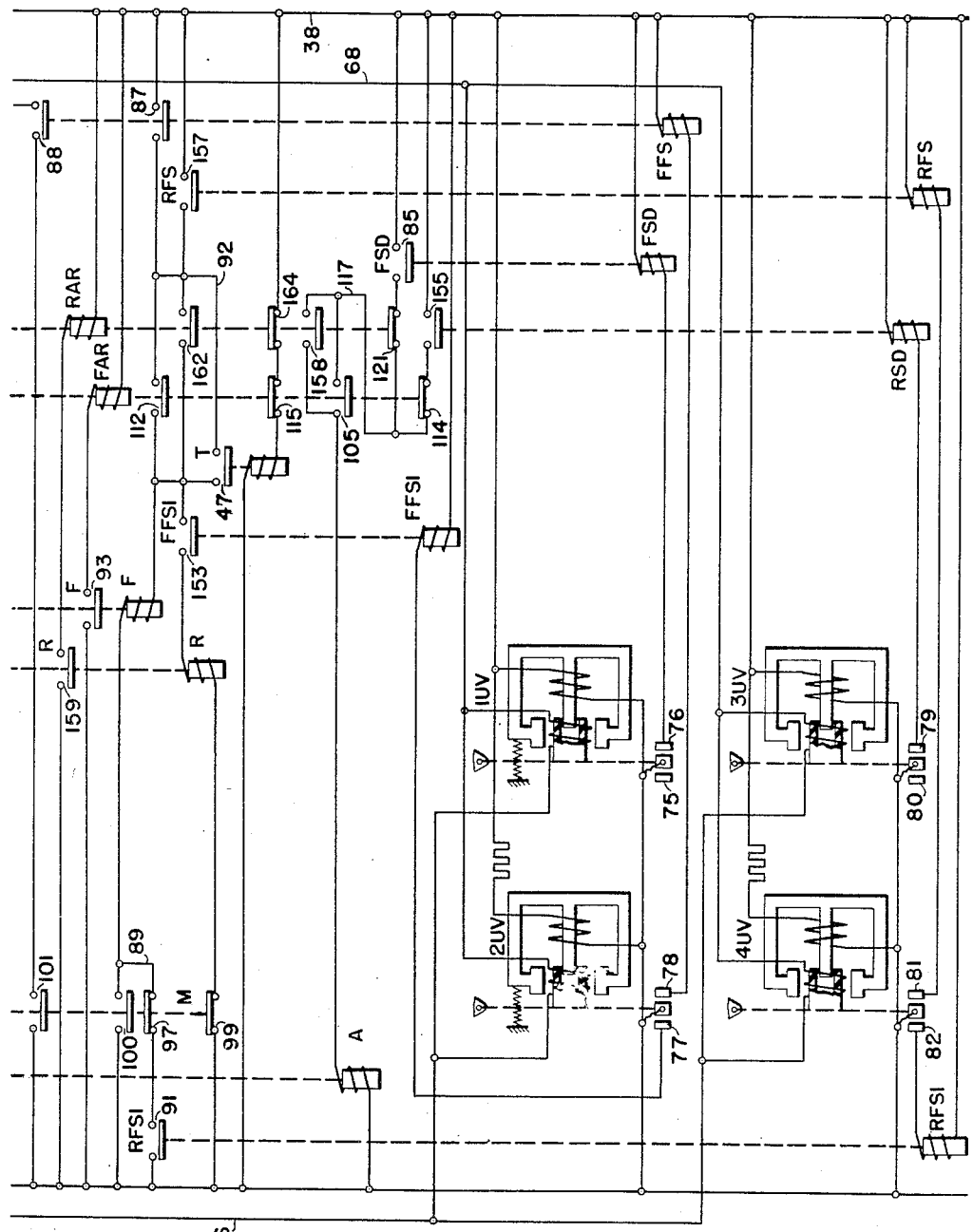
Fig. IA.

United States Patent Office 2,769,124
Patented Oct. 30, 1956

2,769,124

REMOTE CONTROL SYSTEM WITH AUTOMATIC FOLLOW-UP

John R. Erbe, Pittsburgh, Pa., assignor to Westinghouse Electric Corporation, East Pittsburgh, Pa., a corporation of Pennsylvania Application December 12, 1952, Serial No. 325,639

10 Claims. (Cl. 318—29)

The invention relates to an electric control system for automatic drives.

An object of this invention is to provide electric control systems for drives whereby the position of the driven element is determined by remotely disposed positioning means.

A more specific object of this invention is to provide a control system for drives whereby the driven element may be selectively positioned at any one of a plurality of positions as determined by an initiating remote positioning means or will automatically follow the initiating remote device if it should change its position.

The objects recited are merely illustrative. Other objects and advantages will become more apparent from a study of the following specification and the accompanying drawings, in which:

Figures 1 and 1A comprise a diagrammatic showing of the invention.

The system diagrammatically illustrated in Figs. 1 and 1A combined is designed primarily to position an ingot buggy before a soaking pit in accordance with the position of a pit crane, or at the mill in response to a signal from the pit crane. It is to be particularly understood that the application shown is simply one means of illustrating the invention and the invention is not limited thereto or thereby.

In the Figs. 1 and 1A, the ingot buggy is represented by the numeral 10 and is driven by a motor 12 which is part of an adjustable voltage drive system and derives its armature voltage from a main generator 14. A pit crane I and a pit crane II are the remote positioning stations and carry remote positioning means which determine the position of the ingot buggy. The ingot buggy 10 has a runway with a multiplicity of insulated rail sections 20 and the pit cranes I and II have a runway with a similar number of insulated rail sections 22. The two sectionalized rails 20 and 22 are connected in a bridge circuit. The control is then arranged and the segments of the sectionalized rails matched so that the bridge is balanced only when the ingot buggy 10 is exactly opposite the pit crane which is controlling at the time, and in the event the controlling pit crane moves in either direction, the ingot buggy will automatically follow it. Also, the operator in the controlling crane can send the ingot buggy to the mill by operation of the remote control means in the pit crane cab. The polarized relays 1UV, 2UV, 3UV and 4UV detect the difference in position of the ingot buggy 10 from that selected for it by the controlling pit crane, and control the output of amplifying means. The amplifying means consists of the two rotating regulators 32 and 34 which in turn determine the output of the main generator 14 and thus determine the speed and direction of operation of the ingot buggy 10.

With the components of the system in the positions shown in Figs. 1 and 1A, the leads 36 and 38 energized, and the main generator 14 rotating at constant speed, neither of the pit cranes will be determinative of the position of the ingot buggy 10. When the knife switch 40 is closed, the coils of pit crane relays PC1 and PC2 are placed across the lines 36 and 38, thus closing their respective contacts 43 and 45. The coil of time relay T is also placed across the lines 36 and 38 thus closing its contact 47. The coils of the polarized relays 1UV, 2UV, 3UV and 4UV are also energized through circuits across lines 36 and 38. The system is now set up to have either of the pit cranes determine the position of the ingot buggy 10.

Assuming the forward and reverse directions of movement of the ingot buggy 10 are as shown in Fig. 1 and that the operator of pit crane I desires to have the ingot buggy at the soaking pit move opposite his pit crane, he closes contact 48 of the walking beam switch 50 in the cab of his pit crane. A circuit is then completed from the shoe 52 of pit crane I through the contact 48 of the walking beam switch 50, lead 54, contact 56, of the pit crane interlock relay 58, the coil of pit crane interlock relay 60, contact 43 of pit crane relay PC1, the opposite shoe 62 of pit crane I, the solid rail 64 of the pit crane runway, lead 66 through the armature coils of polarized relay 1UV, 2UV, 3UV and 4UV, lead 68, solid rail 70 of the ingot buggy runway, the shoe 72 and 74 of the ingot buggy to the sectionalized rail 20 of the ingot buggy runway. Energization of the coil of pit crane interlock relay 60 opens its contact 61 and thereby insures that the operator of pit crane II cannot control the ingot buggy 10 until the operator of pit crane I has released it.

The sectionalized rails 22 of the pit crane runway are connected to sections of resistor 23 and the secitonalized rails 20 of the ingot buggy runway are connected to sections of resistor 21. Resistor 23 and the sectionalized rails 22 make up two adjacent legs of a bridge circuit and resistor 21 and sectionalized rails 20 make up the other two adjacent legs of the bridge. Both of the resistors 21 and 23 are connected across the source of supply comprising the leads 36 and 38. The circuit completed by closing the contact 48 on the walking beam switch 50 of the pit crane I just described constitutes a diagonal of the bridge and any change of position of the pit crane I will change the position of its shoes 52 and 62 on the rails 22 and 64 of the pit crane runway and thus change the relative impedance of the two legs of the bridge made up of resistor 23. Thus, with the pit crane I and the ingot buggy 10 in the positions shown in Fig. 1, the bridge circuit would be unbalanced and a current would flow through the diagonal of the bridge, the magnitude of the current being determined by the difference of the magnitude and the sense of flow of current in the diagonal of the bridge being determined by the sense of the unbalance of the bridge. In this case, the sense would be such as to cause the ingot buggy to move in the forward direction. That is, the energization of the movable coils of the polarized relays 1UV, 2UV, 3UV and 4UV would cause their respective contacts to close in such a direction as to cause rotating regulators 32 and 34 to so energize the separately excited field winding 15 of the generator to give its output voltage a polarity which would cause the rotor of motor 12 to rotate in a direction to drive the ingot buggy forward.

For the condition assumed, the armature of polarized relay 1UV closes against contact 76. The armature of polarized relay 2UV closes against contact 78. The armature of polarized relay 3UV closes against contact 80 and the armature of polarized relay 4UV closes against contact 82. The closure of contact 76 places the coil of the forward slowdown relay FSD across the lines 36, 38 and thus closes its contact 85. The closure of the contact 78 of polarized relay 2UV places the coil of final stop relay FFS across the energized lines 36 and 38 and causes its contacts 87 and 88 to be closed. The closure of contact 82 of polarized relay 4UV energizes the coil of reverse final stop relay RFS1 between leads 36 and 38 and thus closes its contact 91. The closure of contact 87 on forward final stop relay FFS establishes a circuit from lead 38 through contact 87, lead 92, contact 47 of time relay T, the coil of forward relay F, lead 89, the contact 97 of the mill relay M, contact 91 of reverse final stop relay RFS1 to lead 36. The energization of the coil of forward relay F causes its contacts 93, 95 and 96 to close. The closure of contacts 95 and 96 completes a circuit from lead 36 through resistor 106, lead 107, contact 96, pattern field 108 of rotating regulator 34, pattern field 110 of rotating regulator 32, contact 95 to lead 38. This insures that the pattern fields of the two rotating regulators 32 and 34 will be energized in a sense which will cause the energization of separately excited field 15 of main generator 14 to be energized in the proper sense to cause the motor 12 to drive the ingot buggy 10 in the forward direction.

Closure of contact 93 of the forward relay F completes a circuit from lead 36 through the coil of forward acceleration relay FAR. The energization of the coil of forward acceleration relay FAR closes its contacts 105, 112 and 113, and opens its contacts 114, 115 and 116. Closure of the contact 105 completes a circuit from lead 36 through the coil of acceleration relay A through contact 105 of forward acceleration relay FAR, lead 117, contact 121 of reverse acceleration relay RAR, contact 85 of forward slowdown relay FSD to lead 38. The opening of contact 115 of forward acceleration relay FAR deenergizes the coil of time relay T and causes its contact 47 to be opened, but not until the contact 112 of forward acceleration relay FAR has caused a short-circuit around the contact 47. Thus, the coil of the forward relay F is still energized. Closure of contact 113 causes the coil 122 of the brake BR on the ingot buggy to be energized and thus the brake to be released. Also, a circuit is completed from lead 36 through contacts 113, lead 131, a coil of motor field relay TFE, lead 135 to lead 38. The opening of the contact 116 insures that the coil of the mill relay M is not energized to cause the ingot buggy to go to the mill. The energization of the coil of acceleration relay A closes its contact 119 and thus removes a portion of acceleration resistor 106 which is in series with the pattern fields 108 and 110 of the rotating regulators 34 and 32 respectively. Since the pattern fields 108 and 110 of the rotating regulators 34 and 32 are energized with the greatest voltage when the portion of acceleration resistor 106 is removed from the circuit, the acceleration of the ingot buggy will be greater.

The energization of the coil of field relay TFE closes its contacts 137 to short-circuit a portion of field calibrating resistor 139 which is in series with resistor 140 and the field 13 of motor 12 between the leads 36 and 38. The field relay TFE is simply provided to give the proper excitation of the field 13 of motor 12 when the system is in operation and reduces the excitation of the field when the system is not in operation.

The rotating regulator 34 performs a voltage regulating function and supplies excitation to the separately excited field 15 of the main generator 14 as described. The rotating regulator 34 is provided with a voltage field 130 which is responsive to the voltage of the main generator and an IR field 132 which is responsive to the IR drop in the motor generator loop, in addition to the pattern field 108 and the control field 134 which is supplied with the output of the rotating regulator 32. For normal operating conditions, the voltage field is opposed to the pattern and control fields and the IR field aids them.

Rotating regulator 32 performs current limit functions and is always connected so as to exert its influence over rotating regulator 34. It is also provided with a voltage field 136 which is responsive to the voltage of the main generator 14 and an IR field 138 which is responsive to the IR drop in the motor generator loop. At any time that the motor armature current exceeds a predetermined percentage of rated value either in a motoring or regeneration direction, the generator voltage is modified to either decrease or increase its voltage, respectively, so as to maintain a predetermined motor armature current.

The conditions just described obtain when the ingot buggy is far enough from the position selected for it by the controlling pit crane so that the maximum acceleration may be utilized. When the ingot buggy gets close to the position selected for it, the sensitivity of polarized relays 1UV and 3UV is such that the current through their coils is not sufficient to hold their armature against the contact with which it is closed and thus the circuits closed by these two relays open. The breaking of the armature of polarized relay 1UV with contact 76 deenergized the coil of forward slowdown relay FSD which thus opens its contact 85. This breaks the circuit which contains the coil of acceleration relay A, and causes its contacts 119 to open. The opening of contact 119 causes all of the acceleration resistor 106 to be inserted in series with the pattern fields 108 and 110 of rotating regulators 32 and 34 respectively, thus reducing the energization of the separately excited field 15 of the main generator 14 and consequently the speed or acceleration of the motor 12 on the ingot buggy 10. When the ingot buggy is driven to a position corresponding to the position of the controlling pit crane, its shoes 72 and 74 cause the relative resistance of the legs of the bridge circuit made up of resistor 21 and segmented rail sections 20 to be the same as the ratio of resistance of the legs of the bridge which are made up of the sectionalized rails 22 and resistor 23. Thus, no current will flow through the diagonal of the bridge which contains the polarized relays 1UV, 2UV, 3UV and 4UV and therefore the armatures of these relays will open and all of the relays in the system will again take the position as described for the condition before the moving coils of polarized relays 1UV, 2UV, 3UV and 4UV were placed in the circuit. If the ingot buggy should overrun the position required to balance the bridge (the system is adjusted so that this does not happen in the usual case), the current will flow in the diagonal of the bridge in a sense opposite to the ones just described and thus cause the polarized relays 1UV, 2UV, 3UV and 4UV to pick up in the opposite direction from that just described. This condition will be described in detail for reverse operation of the ingot buggy.

Notice that a voltage relay VR having contacts 141 has its coil connected directly across the armature of the main generator 14 and completes a circuit when picked up from lead 36 through lead 142, the coil 122 of the brake BR on the ingot buggy to lead 38 so that any time the voltage of the generator reaches a predetermined value, the voltage relay VR will pick up and the motor 12 will not be forced to operate against the ingot buggy brake BR.

It will also be noticed that if the ingot buggy 10 is in a position very close to the position called for by the controlling pit crane, that the polarized relays 1UV and 3UV will not pick up. Therefore, forward slowdown relay FSD will not pick up and a circuit is not completed for acceleration relay A. For this condition, the acceleration resistor 106 is in series with the pattern fields 108 and 110 of rotating regulators 34 and 32, respectively, and the ingot buggy 10 will be moved at a slow speed.

Again assuming the ingot buggy 10 and the two pit cranes I and II in the positions shown in Figs. 1 and 1A combined, and knife switch 40 closed, if the operator of pit crane II closes contacts 19 of the walking beam switch 18, a circuit is completed which makes the shoes 148 and 150 and contacts 19 a part of the diagonal cir-

36. Thus the ingot buggy must be at the mill end of the runway. The polarized relays 1UV, 2UV, 3UV and 4UV will operate in exactly the same manner as described for forward operation of the ingot buggy and the relay circuits will be set up in the same way except as described herein.

The operation of mill relay M opens contacts 97 so that a circuit can no longer be made for the coil of the forward relay F from lead 36, contacts 91 of the first reversed final stop relay RFS1, contacts 97, the contacts 112 of the forward acceleration relay FAR, and contacts 87 of the forward final stop relay FFS to lead 38, but the mill relay M closes contacts 100 which bypass the contacts 91 of the first reverse final stop relay RFS1 and the now open contacts 97 to thus complete the same circuit for the coil of forward relay F. When the coil of the forward acceleration relay FAR is energized and that relay picks up, its contacts 116 are opened, thus breaking the circuit for the coil of the mill relay M, but since the coil of forward final stop relay FFS is now energized, and its contacts 88 are now closed, another circuit for the coil of the mill relay M is completed from lead 36, contacts 101 of mill relay M, contacts 88 of forward final stop relay FFS, lead 170 to the coil of mill relay M through lead 146 to lead 38, so the mill relay M is locked in the circuit, until the ingot buggy has reached the middle position and the bridge is again balanced, thus allowing the forward final stop relay FFS to open the circuit just described.

It will also be seen that the ingot buggy can be made to follow the controlling pit crane to any position, as well as move to the position occupied by that pit crane. Thus, the operator of either pit crane can control the ingot buggy 10 while his crane is in motion.

The prime advantages of this scheme are that it reduces the personnel required to operate the soaking pit, pit cranes, and ingot buggy to a minimum since only the crane operators are required. The system also has the advantage over using multiple relays to accomplish the same result, that it uses less control equipment, reduces maintenance to a minimum and thus provides the reliability so desirable in systems of its kind. It will thus be seen and readily understood that auxiliary equipment cound be used to good advantage in the system illustrated and that the system is not applicable only to the particular use described. The system could be used to effect remote control and automatic follow-up in many applications.

I claim as my invention:

1. A control system for electrical apparatus comprising, a bridge circuit, impedance means forming the legs of said bridge circuit, terminals at two opposite diagonals of said bridge circuit for receiving an energizing voltage, a remote positioning station, a driven member, a runway for the driven member comprising a solid rail and a rail consisting of a plurality of rail sections insulated with respect to each other, a runway for the remote positioning station comprising a solid rail and a rail consisting of a plurality of rail sections insulated with respect to each other, the sectionalized rail for the driven member runway having each section connected to a portion of the impedance means which makes up two adjacent bridge legs and the sections of the sectionalized rail for the remote positioning station runway having each section connected to a portion of the impedance means which makes up the two opposite legs of said bridge, said remote positioning station being adapted to move along its runway to determine the relative impedance of the two adjacent legs connected with the sectionalized rail of the runway for the remote positioning station and said driven member being movable along its runway to determine the relative impedance of the two opposite legs of said bridge, polarized means responsive to an unbalance of said bridge, a drive motor, a main generator in circuit relationship with said drive motor, excitation means for said generator, amplifying means, said amplifying means being associated with said polarized means and said generator excitation means in such a manner as to control the generator voltage in response to the unbalance of the bridge and thus cause said drive motor to drive the driven member to the position which causes the bridge to be balanced.

2. A control system for electrical apparatus comprising, a bridge circuit, impedance means forming the legs of said bridge circuit, terminals at two opposite diagonals of said bridge circuit for receiving an energizing voltage, a remote positioning station, a driven member, a runway for the driven member comprising a solid rail and a rail consisting of a plurality of rail sections insulated with respect to each other, a runway for the remote positioning station comprising a solid rail and a rail consisting of a plurality of rail sections insulated with respect to each other, the sectionalized rail for the driven member runway having each section connected to a portion of the impedance means which makes up two adjacent bridge legs and the sections of the sectionalized rail for the remote positioning station runway having each section connected to a portion of the impedance means which makes up the two opposite legs of said bridge, said remote positioning station being adapted to move along its runway to determine the relative impedance of the two adjacent legs connected with the sectionalized rail of the runway for the remote positioning station and said driven member being movable along its runway to determine the relative impedance of the two opposite legs of said bridge, polarized means responsive to an unbalance of said bridge, a drive motor, a main generator in circuit relationship with said drive motor, excitation means for said generator, amplifying means consisting of at least one rotating regulator, said amplifying means being associated with said polarized means and said generator excitation means in such a manner as to control the generator voltage in response to the unbalance of the bridge and thus cause said drive motor to drive the driven member to the position which causes the bridge to be balanced.

3. A control system for electrical apparatus comprising, a bridge circuit, impedance means forming the legs of said bridge circuit, terminals at two opposite diagonals of said bridge circuit for receiving an energizing voltage, a remote positioning station, a driven member, a runway for the driven member comprising a solid rail and a rail consisting of a plurality of rail sections insulated with respect to each other, a runway for the remote positioning station comprising a solid rail and a rail consisting of a plurality of rail sections insulated with respect to each other, the sectionalized rail for the driven member runway having each section connected to a portion of the impedance means which makes up two adjacent bridge legs and the sections of the sectionalized rail for the remote positioning station runway having each section connected to a portion of the impedance means which makes up the two opoposite legs of said bridge, said remote positioning station being adapted to move along its runway to determine the relative impedance of the two adjacent legs connected with the sectionalized rail of the runway for the remote positioning station and said driven member being movable along its runway to determine the relative impedance of the two opposite legs of said bridge, polarized means responsive to an unbalance of said bridge, a drive motor, a main generator in circuit relationship with said drive motor, excitation means for said generator, amplifying means consisting of at least one rotating regulator, first output control means for each rotating regulator responsive to said polarized means, second output control means responsive to the voltage of the main generator, and third output control means responsive to the IR drop in the circuit of the drive motor and generator, said amplifying means being associated with said generator excitation means in such a manner as to control the generator voltage in and cuit of the bridge which includes contacts 61 of pit crane interlock relay 60, contacts 45 of pit crane relay PC2, the coil of pit crane interlock relay 58, the solid rail 64 of the pit crane runway, the moving coils of polarized relays 1UV, 2UV, 3UV and 4UV, the solid rail 70, shoes 72, 74 and sectionalized rail 20 for the ingot buggy runway in the same manner as were the shoes 52, 62 for the system with pit crane I in control as previously described. This time, however, it may be observed that the ingot buggy must be moved in the reverse direction in order to balance the bridge circuit and the current will flow through this diagonal of the bridge in the opposite direction to that previously described, thus causing the armatures of the polarized relays to close with the opposite contacts, that is, the armature of polarized relay 1UV closes on contacts 75, the armature of the relay 2UV closes on contact 77, the armature of relay 3UV closes on contact 79, and the armature of relay 4UV closes on contact 81. This puts the coil of forward final stop relay FFS1, the coil of the reverse slowdown relay RSD and the coil of the reverse final stop relay RFS directly between the leads 36 and 38.

The energization of the coil of reverse final stop relay RFS closes its contact 157 and the energization of the forward final stop relay FFS1 closes its contact 153, thus completing a circuit from lead 36 through contacts 99 of the mill relay M, the coil of reverse relay R, contacts 153 of forward final stop relay FFS1 to the contacts 47 of time relay T, lead 92, contacts 157 of reverse final stop relay RFS to lead 38. The energization of the coil of the reverse relay causes contacts 159, 160 and 161 to close. The closure of contacts 160 and 161 completes a circuit from lead 36 through acceleration resistor 106, contacts 160, the pattern fields 110 and 108 of the rotating generators 32 and 34 respectively through contacts 161 of reverse relay R, lead 146 to lead 38. As may be seen, the pattern fields 110 and 108 of rotating regulators 32 and 34 respectively are energized in the opposite sense to their energization for forward operation, and thus the ingot buggy will be driven in the reverse direction.

Closing the contacts 159 of reverse relay R completes a circuit from lead 36, contacts 159, through the coil of reverse acceleration relay RAR to lead 38, and since the energization of the coil of the reverse slowdown relay RSD has been accomplished, a circuit is completed from lead 36 through the coil of acceleration relay A through the contacts 158 of the reverse acceleration relay RAR, lead 117, through the contacts 114 of forward acceleration relay FAR, contacts 155 of reverse slowdown relay RSD to lead 38. Thus the acceleration relay A is picked up and its contacts 119 short-circuit a portion of acceleration resistor 106 so that the pattern fields 110 and 108 of regulating generators 32 and 34 will receive a maximum energization. The reverse acceleration relay RAR also closes its contacts 163 to complete a circuit from lead 36 through contacts 163, lead 131, the coil of the motor, field relay TFE, lead 135, to lead 38, and a circuit through the coil 122 of brake BR on the ingot buggy 10 to lead 38. The energization of the brake coil 122 insures that the drive motor 12 for ingot buggy 10 will not be driven against the brake BR and the energization of the coil of motor field relay TFE closes its contacts 137 to remove a portion of field resistance 139 from the circuit of the field 13 for drive motor 12 as has been previously described. The opening of contacts 164 for reverse acceleration relay RAR removes the coil of the time relay T from the circuit to open its contacts 47, but again not until the contacts 162 of reverse acceleration relay RAR have been closed around the contacts 47 to hold reverse relay R in the circuit. The opening of contacts 121 have no effect on the circuits as a circuit is already completed to lead 117 from lead 38 through contacts 155 of reverse slowdown relay RSD and contacts 114 of forward acceleration relay FAR.

When the ingot buggy approaches the position selected for it by the operator of the controlling pit crane, again the less sensitive polarized relay 1UV and 3UV will drop out and thus the reverse slowdown relay RSD will open its contacts 155 to remove the coil of acceleration relay A from the circuit. This will cause its contacts 119 to drop out and thus insert acceleration resistor 106 in series with the pattern fields 110 and 108 so that their energization is reduced and the ingot buggy drive motor 12 will then slow down. When the ingot buggy is in the position selected, the armatures of the remaining polarized relays will drop out and the generator will no longer supply the drive motor 12 with the voltage to drive the ingot buggy.

If the ingot buggy 10 were to overshoot the position selected for it, the bridge would again be unbalanced but the current flowing through the coils of the polarized relays would be in an opposite sense and would thus close the armature of polarized relay 2UV with contact 78 and the armature of polarized relay 4UV with contact 82. This would happen before the ingot buggy 10 overshot its preselected position to such an extent that the armatures of polarized relays 1UV and 3UV would pick up. Thus the control system would be set up to operate the ingot buggy in the forward position at slow speed (i. e., with acceleration relay A deenergized and acceleration resistor 106 in series with pattern fields 108 and 110 of rotating regulator 34 and 32 respectively). This condition is the same as the slow speed forward condition already described, thus the ingot buggy returns to the position which exactly balances the bridge at slow speed and the polarized relays are all deenergized.

If the ingot buggy 10 should overshoot its position while operating in the forward direction, the same condition would obtain as that for slow speed operation in the reverse direction until the bridge is balanced, that is, polarized relays 1UV and 3UV would not pick up, and therefore acceleration relay A would not be energized.

If the ingot buggy is released, and if the operator of either of the pit cranes desires to send the ingot buggy to the mill with an ingot, either operator may simply close the mill contact of the remote control means at his crane cab, that is, in the cab of pit crane I, the mill contact 49 of walking beam switch 50 or the operator of pit crane II may close mill contact 17 of the walking beam switch 18. In either case, a circuit is made from the junction of the bridge circuit at which lead 36 is attached through the mill contacts 17 or 49, depending upon the controlling crane, to lead 144 through contacts 116 of forward acceleration relay FAR through the coil of mill relay M, lead 146 to lead 38 which is connected to a junction at the opposite diagonal of the bridge circuit. The energization of the coil of mill relay M opens its contacts 103 which insures that neither the pit crane relay PC1 nor the pit crane relay PC2 can be energized, and this interlock insures that the buggy cannot again follow either crane until it has first gone to the mill and completed its cycle to unload the ingot. Contacts 99 of the mill relay M are also open, which insures that the reverse relay R cannot be closed and thus that the ingot buggy must always operate in the forward direction if at all when one of the mill contacts is closed. The contacts 102 of the mill relay M will be closed, thus completing a circuit from the sectionalized rails 22 through the contacts 102 through the moving coils of polarizing relays 1UV, 2UV, 3UV and 4UV, to the solid rail 70, the shoes 72 and 74 and sectionalized rail 20 in the ingot buggy of the ingot buggy runway. Thus effectively the diagonal of the bridge is connected from lead 36 through the moving coils of polarized relays 1UV, 2UV, 3UV and 4UV to the point on the sectionalized rail 20 of the ingot buggy runway contacted by the shoe 74 of the ingot buggy. It will be seen that if the bridge is to be balanced, the ingot buggy must be in such a position that shoe 74 is effectively in contact with lead cause the drive motor to drive the driven member to the position which causes the bridge to be balanced.

4. A control system for electrical apparatus comprising, a bridge circuit, impedance means forming the legs of said bridge circuit, terminals at two opposite diagonals of said bridge circuit for receiving an energizing voltage, at least two remote positioning stations, a driven member, a runway for the driven member comprising a solid rail and a rail consisting of a plurality of rail sections insulated with respect to each other, a runway for the remote positioning stations consisting of a plurality of rail sections insulated with respect to each other, the sectionalized rail for the driven member runway having each section connected to a portion of the impedance means which makes up two adjacent bridge legs and the sections of the sectionalized rail for the runway of the remote positioning stations having each section connected to a portion of the impedance means which makes up the two opposite legs of said bridge, said remote positioning stations being movable along their runway to determine the relative impedance of the two adjacent legs of the bridge circuit connected with the sectionalized rail of the runway for the remote positioning stations and said driven member being movable along its runway to determine the relative impedance of the opposite two adjacent legs of said bridge, a drive motor, a main generator in circuit relationship with said drive motor, excitation means for said generator, amplifying means, said amplifying means being associated with said polarized means and said generator excitation means in such a manner as to control the generator voltage in response to the unbalance of the bridge and thus cause said drive motor to drive the driven member to the position which causes the bridge to be balanced.

5. A control system for electrical apparatus comprising, a bridge circuit, impedance means forming the legs of said bridge circuit, terminals at two opposite diagonals of said bridge circuit for receiving an energizing voltage, at least two remote positioning stations, a driven member, a runway for the driven member comprising a solid rail and a rail consisting of a plurality of rail sections insulated with respect to each other, a runway for the remote positioning stations consisting of a plurality of rail sections insulated with respect to each other, the sectionalized rail for the driven member runway having each section connected to a portion of the impedance means which makes up two adjacent bridge legs and the sections of the sectionalized rail for the runway of the remote positioning stations having each section connected to a portion of the impedance means which makes up the two opposite legs of said bridge, said remote positioning stations being movable along their runway to determine the relative impedance of the two adjacent legs of the bridge circuit connected with the sectionalized rail of the runway for the remote positioning stations and said driven member being movable along its runway to determine the relative impedance of the opposite two adjacent legs of said bridge, a drive motor, a main generator in circuit relationship with said drive motor, excitation means for said generator, amplifying means consisting of at least one rotating regulator, said amplifying means being associated with said polarized means and said generator excitation means in such a manner as to control the generator voltage in response to the unbalance of the bridge and thus cause said drive motor to drive the driven member to the position which causes the bridge to be balanced.

6. A control system for electrical apparatus comprising, a bridge circuit, impedance means forming the legs of said bridge circuit, terminals at two opposite diagonals of said bridge circuit for receiving an energizing voltage, at least two remote positioning stations, a driven member, a runway for the driven member comprising a solid rail and a rail consisting of a plurality of rail sections insulated with respect to each other, a runway for the remote positioning stations consisting of a plurality of rail sections insulated with respect to each other, the sectionalized rail for the driven member runway having each section connected to a portion of the impedance means which makes up two adjacent bridge legs and the sections of the sectionalized rail for the runway of the remote positioning stations having each section connected to a portion of the impedance means which makes up the two opposite legs of said bridge, said remote positioning stations being movable along their runway to determine the relative impedance of the two adjacent legs of the bridge circuit connected with the sectionalized rail of the runway for the remote positioning stations and said driven member being movable along its runway to determine the relative impedance of the opposite two adjacent legs of said bridge, a drive motor, a main generator in circuit relationship with said drive motor, excitation means for said generator, amplifying means consisting of at least one rotating regulator, output control means for said rotating regulator operatively associated with said polarized means and responsive to the voltage of the main generator and the IR drop in the circuit of the drive motor and generator, said amplifying means being associated with said generator excitation means in such a manner as to control the generator voltage and cause said drive motor to drive the driven member to the position which causes the bridge to be balanced.

7. A control system for electrical apparatus comprising, a bridge circuit, impedance means forming the legs of said bridge circuit, terminals at two opposite diagonals of said bridge circuit for receiving an energizing voltage, at least two remote positioning stations, a driven member, a runway for the driven member comprising a solid rail and a rail consisting of a plurality of rail sections insulated with respect to each other, a runway for the remote positioning stations consisting of a plurality of rail sections insulated with respect to each other, the sectionalized rail for the driven member runway having each section connected to a portion of the impedance means which makes up two adjacent bridge legs and the sections of the sectionalized rail for the runway of the remote positioning stations having each section connected to a portion of the impedance means which makes up the two opposite legs of said bridge, said remote positioning stations being movable along their runway to determine the relative impedance of the two adjacent legs of the bridge circuit connected with the sectionalized rail of the runway for the remote positioning stations and said driven member being movable along its runway to determine the relative impedance of the opposite two adjacent legs of said bridge, a drive motor, a main generator in circuit relationship with said drive motor, excitation means for said generator, amplifying means consisting of at least one rotating regulator, first output control means for each rotating regulator responsive to said polarized means, second output control means responsive to the voltage of the main generator, and third output control means responsive to the IR drop in the circuit of the drive motor and generator, said amplifying means being associated with said generator excitation means in such a manner as to control the generator voltage in and cause the drive motor to drive the driven member to the position which causes the bridge to be balanced.

8. A control system for electrical apparatus comprising, a bridge circuit, impedance means forming the legs of said bridge circuit, terminals at two opposite diagonals of said bridge circuit for receiving an energizing voltage, a remote positioning station, a driven member, a runway for the driven member comprising a solid rail and a rail consisting of a plurality of rail sections insulated with respect to each other, a runway for the remote positioning station comprising a solid rail and a rail consisting of a plurality of rail sections insulated with respect to each other, the sectionalized rail for the driven member runway having each section connected to a portion of the impedance means which makes up two adjacent bridge legs and the sections of the sectionalized rail for the remote positioning station runway having each section connected to a portion of the impedance means which makes up the two opposite legs of said bridge, said remote positioning station being adapted to move along its runway to determine the relative impedance of the two adjacent legs connected with the sectionalized rail of the runway for the remote positioning station and said driven member being movable along its runway to determine the relative impedance of the two opposite legs of said bridge, polarized means responsive to an unbalance of said bridge amplifying means consisting of at least one rotating regulator operating substantially along its air gap line and a drive motor, a main generator in circuit relationship with said drive motor, excitation means for said generator, amplifying means, said amplifying means being associated with said polarized means and said generator excitation means in such a manner as to control the generator voltage in response to the unbalance of the bridge and thus cause said drive motor to drive the driven member to the position which causes the bridge to be balanced.

9. In a control for an automatic drive system comprising first and second parallel connected resistance means connected across terminals for receiving an energizing voltage, a first movable tap on said first resistance means, a driven element connected to said movable tap so that the voltage at said tap is indicative of the position of said driven element, at least two remote positioning stations, second movable taps on said second resistance means corresponding in number to said stations, each of said second taps being connected to a different station and movable therewith so that the voltage at a given second tap is indicative of the position of the station corresponding thereto; a drive motor for said driven element; a main generator in circuit relationship with said drive motor, first output control means for said main generator responsive to the sense and magnitude of the voltage difference between said first movable tap and a selected one of said second movable taps to energize said motor to drive said driven element so as to minimize the said voltage difference; first means selectively connecting said output control means to said second movable taps, said means including first switch means corresponding in number to said remote positioning station; one switch means mounted at each of said stations; interlock means in circuit relation with said switch means operable upon actuation of one of said switch means to render each of said other switch means ineffective to connect the tap corresponding thereto to said output control means; second output control means for said main generator effective to energize said motor so as to drive said first driven element and the tap connected thereto to a given extremity of said first resistance means responsive to actuation of one of second switch means corresponding in number to said remote positioning means, one of said second switch means being mounted at each of said stations, said second switch means being in circuit relationship with each of said interlock means to render each of said first switch means ineffective to connect the tap corresponding thereto to said output control means until the tap connected to said driven element reaches the said given extremity of said first resistance means.

10. A control system for electrical apparatus comprising, a bridge circuit, impedance means forming the legs of said bridge circuit, terminals at two opposite diagonals of said bridge circuit for receiving an energizing voltage, at least two remote positioning stations, a driven member, a runway for the driven member comprising a solid rail and a rail consisting of a plurality of rail sections insulated with respect to each other, a runway for the remote positioning stations consisting of a plurality of rail sections insulated with respect to each other, the sectionalized rail for the driven member runway having each section connected to a portion of the impedance means which makes up two adjacent bridge legs and the sections of the sectionalized rail for the runway of the remote positioning stations having each section connected to a portion of the impedance means which makes up the two opposite legs of said bridge, said remote positioning stations being movable along their runway to determine the relative impedance of the two adjacent legs of the bridge circuit connected with the sectionalized rail of the runway for the remote positioning stations and said driven member being movable along its runway to determine the relative impedance of the opposite two adjacent legs of said bridge, a drive motor, a main generator in circuit relationship with said drive motor, excitation means for said generator, amplifying means, said amplifying means being associated with said polarized means and said generator excitation means so as to control the generator voltage in response to the unbalance of the bridge and thus cause said drive motor to drive the driven member to the position which causes the bridge to be balanced, and means response to actuation of said switch means at said remote positioning stations for actuating said polarized means to drive said driven member to a given extremity of its runway, said means including interlock means for rendering said bridge circuit ineffective to control the position of said driven member until said driven member reaches said given extremity of its runway.

References Cited in the file of this patent

UNITED STATES PATENTS

| | | |
|---|---|---|
| 2,384,380 | Isserstedt | Sept. 4, 1945 |
| 2,420,501 | Smith | May 13, 1947 |
| 2,460,497 | Frisk et al. | Feb. 1, 1949 |
| 2,467,454 | Arnot | Apr. 19, 1949 |
| 2,471,075 | Montrose-Oster | May 24, 1949 |
| 2,660,699 | Helot | Nov. 24, 1953 |